(12) United States Patent
Han et al.

(10) Patent No.: US 12,485,731 B2
(45) Date of Patent: Dec. 2, 2025

(54) ROOF-TYPE AIR CONDITIONER

(71) Applicants: HYUNDAI MOTOR COMPANY, Seoul (KR); KIA CORPORATION, Seoul (KR); DOOWON CLIMATE CONTROL CO., LTD., Anyang-si (KR)

(72) Inventors: Kwang Ok Han, Seoul (KR); Myung Hoe Kim, Seoul (KR); Nam Seok Yun, Hwaseong-si (KR); Su Yeon Kang, Seoul (KR); Kwang Woon Cho, Yongin-si (KR); Yeong Jun Kim, Incheon (KR); Jae Won Cha, Pyeongtaek-si (KR); Won Jun Joung, Uiwang-si (KR); Byung Guk An, Anyang-si (KR)

(73) Assignees: HYUNDAI MOTOR COMPANY, Seoul (KR); KIA CORPORATION, Seoul (KR); DOOWON CLIMATE CONTROL CO., LTD., Asan-si (KR)

( * ) Notice: Subject to any disclaimer, the term of this patent is extended or adjusted under 35 U.S.C. 154(b) by 202 days.

(21) Appl. No.: 18/228,855

(22) Filed: Aug. 1, 2023

(65) Prior Publication Data

US 2024/0286461 A1 Aug. 29, 2024

(30) Foreign Application Priority Data

Feb. 23, 2023 (KR) .......................... 10-2023-0024277

(51) Int. Cl.
*B60H 1/32* (2006.01)
*B60H 1/00* (2006.01)

(52) U.S. Cl.
CPC ....... *B60H 1/3233* (2013.01); *B60H 1/00207* (2013.01); *B60H 1/00564* (2013.01); *B60H 2001/00235* (2013.01)

(58) Field of Classification Search
CPC ............ B60H 1/00364; B60H 1/00371; B60H 1/3233; F25D 21/14; F24F 13/22; F24F 13/222
See application file for complete search history.

(56) References Cited

U.S. PATENT DOCUMENTS

| | | | | |
|---|---|---|---|---|
| 290,306 | A | * | 12/1883 | Adams ..................... F25D 21/14 62/413 |
| 2,054,350 | A | * | 9/1936 | Weiland ............. B61D 27/0018 62/448 |
| 2,095,219 | A | * | 10/1937 | Lear ........................ F25D 21/14 62/404 |

(Continued)

FOREIGN PATENT DOCUMENTS

| | | | | |
|---|---|---|---|---|
| KR | 200000015483 | * | 8/2000 | ............... B60H 1/32 |
| KR | 20100028739 A | | 3/2010 | |

*Primary Examiner* — Christopher R Zerphey
(74) *Attorney, Agent, or Firm* — Lempia Summerfield Katz LLC (57) ABSTRACT

A roof-type air conditioner is provided in which condensate water generated during interior cooling by an air conditioning unit is collected in a collecting unit to prevent the condensate water from flowing into an interior space of a vehicle. Due to accumulation of the condensate water, the condensate water collected by the collecting unit is discharged to the outside of the vehicle to prevent overflow and contamination of condensate water.

12 Claims, 9 Drawing Sheets

(56) References Cited

U.S. PATENT DOCUMENTS

| | | | | | |
|---|---|---|---|---|---|
| 2,104,845 | A | * | 1/1938 | Anderson | F25D 21/14 |
| | | | | | 62/288 |
| 2,111,570 | A | * | 3/1938 | Neeson | F24F 13/22 |
| | | | | | 261/78.2 |
| 2,111,905 | A | * | 3/1938 | Smith, Jr. | B61D 27/0018 |
| | | | | | 62/460 |
| 2,305,141 | A | * | 12/1942 | Crede | B61D 27/0081 |
| | | | | | 454/88 |
| 4,592,210 | A | * | 6/1986 | Hirayama | F24F 1/0059 |
| | | | | | 62/272 |
| 5,632,330 | A | * | 5/1997 | Drucker | B60H 1/00371 |
| | | | | | 165/44 |
| 5,791,156 | A | * | 8/1998 | Strautman | B60H 1/00364 |
| | | | | | 296/38 |
| 2017/0036515 | A1 | * | 2/2017 | Ko | B60H 1/00514 |
| 2018/0220555 | A1 | * | 8/2018 | Schmidt | H05K 7/20872 |

\* cited by examiner

ROOF-TYPE AIR CONDITIONER

CROSS-REFERENCE TO RELATED APPLICATION (S)

This application claims priority to and the benefit of Korean Patent Application No. 10-2023-0024277, filed on Feb. 23, 2023, the disclosure of which is herein incorporated by reference in its entirety.

BACKGROUND

1. Field of the Disclosure

The present disclosure relates to a roof-type air conditioner configured to prevent condensate water, which is generated during interior (e.g., indoor) cooling, from flowing into the interior of a vehicle.

2. Description of the Prior Art

In general, air conditioners in vehicles are designed as front air conditioners, which are configured such that air for cooling or heating is discharged from a discharge port provided in an instrument panel in front of a vehicle interior. However, in a vehicle with a large interior space, the cooling or heating effect does not sufficiently reach the rear seats.

Accordingly, in order to assist cooling and heating performance for the rear seats, a rear seat air conditioner or a roof-type air conditioner may be installed on the roof of a vehicle to discharge conditioned air over an occupant's head.

However, in a roof-type air conditioner, when air is cooled through an evaporator, a problem occurs where generated condensate water flows into the interior of the vehicle since the air conditioner is installed on the roof.

In particular, when the performance of the roof-type air conditioner is improved, the amount of condensate water generated is also increased. Yet, due to the design of the roof space, there is limited space available for incorporating a separate device to discharge the condensate water.

The foregoing matters described above as the background art are provided only for promoting the understanding of the background of the present disclosure. The foregoing description of the background art should not be construed as admitting that the matters described above correspond to the prior art already known to those having ordinary skill in the art.

SUMMARY

The present disclosure has been proposed to solve these problems and is intended to provide a roof-type air conditioner that ensures interior comfort by preventing condensate water generated during interior cooling from entering the interior space.

In an embodiment of the present disclosure, a roof-type air conditioner may include an opening section opened in a roof to communicate with an interior space of a vehicle. The roof-type air conditioner may also include a roof duct having a duct flow path configured to communicate with the opening section in the roof. The roof-type air conditioner may also include an air-conditioning unit provided in the opening section and configured to heat or cool air, such as to provide the heated or cooled air to the roof duct. Furthermore, the roof-type air conditioner may include a collecting unit provided under the air-conditioning unit in the opening section. The collecting unit may include multiple guide portions configured to guide the condensate water generated in the air-conditioning unit and multiple collecting portions configured to collect the condensate water. The multiple guide portions and the multiple collecting portions are arranged to be spaced apart from the opening section and to cross over each other vertically.

The air-conditioning unit may include a blower and an interior heat exchanger. The air-conditioning unit may be configured to suction interior air, adjust a temperature of the interior air, and then supply the interior air to the roof duct.

The roof-type air conditioner may further include a case fixed to the upper side of the opening section in the roof. The air-conditioning unit is provided inside the case.

The roof may be provided with an outer wall surface and an inner wall surface on sides of the opening section in the roof. The outer wall surface and the inner wall surface may be spaced apart from each other to provide a circulation flow path therebetween. The circulation flow path may be provided to fluidly communicate with the duct flow path.

The inner wall surface may include an upper end which is spaced apart from the upper end of the outer wall surface and a lower end to which the guide portions or the collecting portions of the collecting unit are connected.

The upper end of the inner wall surface may extend to be curved outward.

The guide portions and the collecting portions may each extend in one direction, and may be arranged in a direction orthogonal to the extending direction.

The guide portions may have a cross-sectional shape of which the width gradually increases toward the lower side.

The collecting portions may have a cross-sectional shape of which a width gradually increases toward an upper side.

The guide portions have a horizontal width that is greater than a separation distance between adjacent ones of the collecting portions.

The guide portions may be opened downward, and the collecting portions may be opened upward, so that the guide portions and the collecting portions are partially inserted into mutually opened portions.

The collecting portions may have a condensate water collection capacity that is determined depending on an amount of dehumidification of the air-conditioning unit.

The collecting unit may further include a housing to which opposite ends of the multiple guide portions and multiple collecting portions are connected. The housing may be provided with a discharge flow path such that the condensate water collected in each of the collecting portions is discharged outside.

The roof may be provided with a drain flow path which is connected to the discharge flow path of the housing and extends outside of the vehicle such that the condensate water in the housing is discharged outside.

In the roof-type air conditioner having the structure as described above, since the condensate water generated d during interior cooling through the air-conditioning unit is collected in the collecting unit, the condensate water is prevented from flowing into the interior of the vehicle. Furthermore, since the condensate water collected by the collecting unit is discharged to the outside, the overflow and contamination of condensate water due to the accumulation of the condensate water are prevented.

BRIEF DESCRIPTION OF THE DRAWINGS

In order that the disclosure may be well understood, there are now described various forms thereof, given by way of example, reference being made to the accompanying drawings, in which.

DETAILED DESCRIPTION

Hereinafter, embodiments disclosed in the present specification are described in detail with reference to the accompanying drawings. In the present specification, the same or similar elements are given the same and similar reference numerals, so duplicate descriptions thereof are omitted.

The terms "module" and "unit" used for the elements in the following description are given or interchangeably used in consideration of only the ease of writing the specification, and do not have distinct meanings or roles by themselves.

In describing the embodiments disclosed in the present specification, when the detailed description of the relevant known technology is determined to unnecessarily obscure the gist of the present disclosure, the detailed description may be omitted. Furthermore, the accompanying drawings are provided only for easy understanding of the embodiments disclosed in the present specification, and the technical spirit disclosed herein is not limited to the accompanying drawings. It should be understood that all changes, equivalents, or substitutes thereof are included in the spirit and scope of the present disclosure.

Terms including an ordinal number such as "first," "second," or the like may be used to describe various elements, but the elements are not limited to the terms. The above terms are used only for the purpose of distinguishing one element from another element.

In the case where an element is referred to as being "connected" or "coupled" to any other element, it should be understood that another element may be provided therebetween, as well as that the element may be directly connected or coupled to the other element. In contrast, in the case where an element is "directly connected" or "directly coupled" to any other element, it should be understood that no other element is present therebetween.

A singular expression may include a plural expression unless they are definitely different in a context. When a component, device, element, or the like of the present disclosure is described as having a purpose or performing an operation, function, or the like, the component, device, or element should be considered herein as being "configured to" meet that purpose or to perform that operation or function.

As used herein, the expressions "include" or "have" are intended to specify the existence of mentioned features, numbers, steps, operations, elements, components, or combinations thereof. Such terms should be construed as not precluding the possible existence or addition of one or more other features, numbers, steps, operations, elements, components, or combinations thereof.

Hereinafter, a roof-type air conditioner according to an embodiment of the present disclosure is described with reference to the accompanying drawings.

Figure 1:
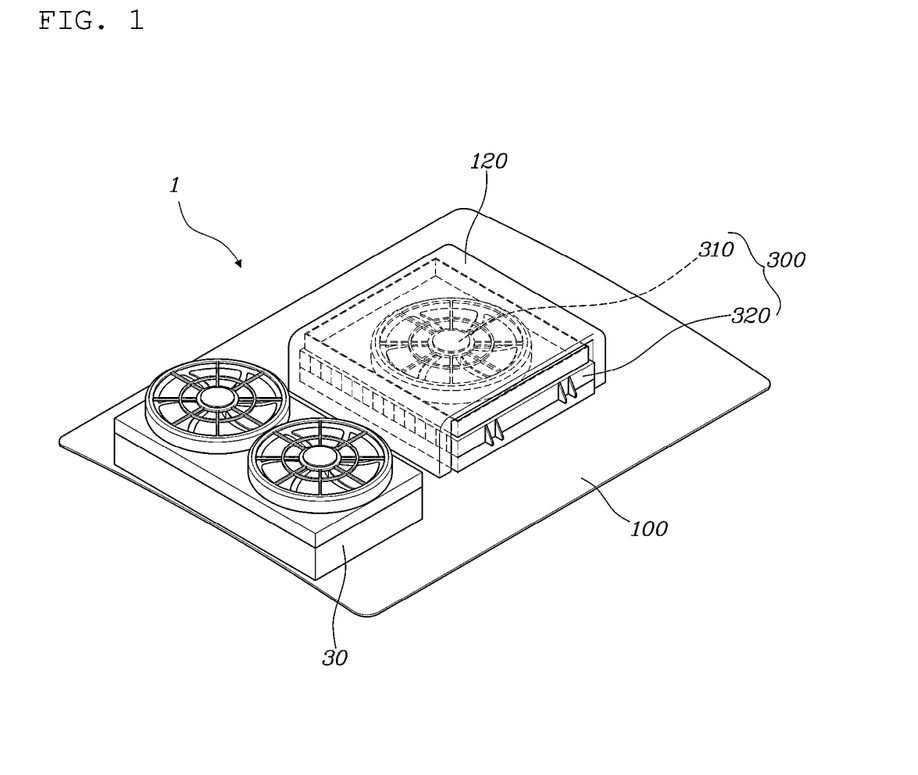
FIG. 1 is a view illustrating a roof-type air conditioner according to an embodiment of the present disclosure.
Figure 2:
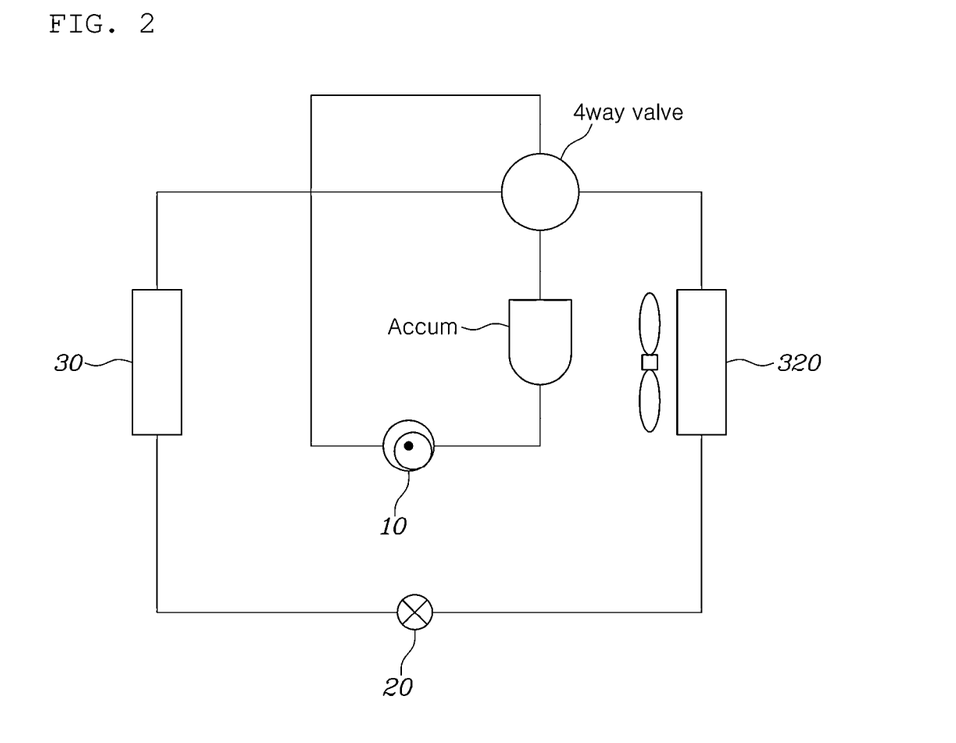
FIG. 2 is a block diagram of the roof-type air conditioner according to an embodiment of the present disclosure.
Figure 3:
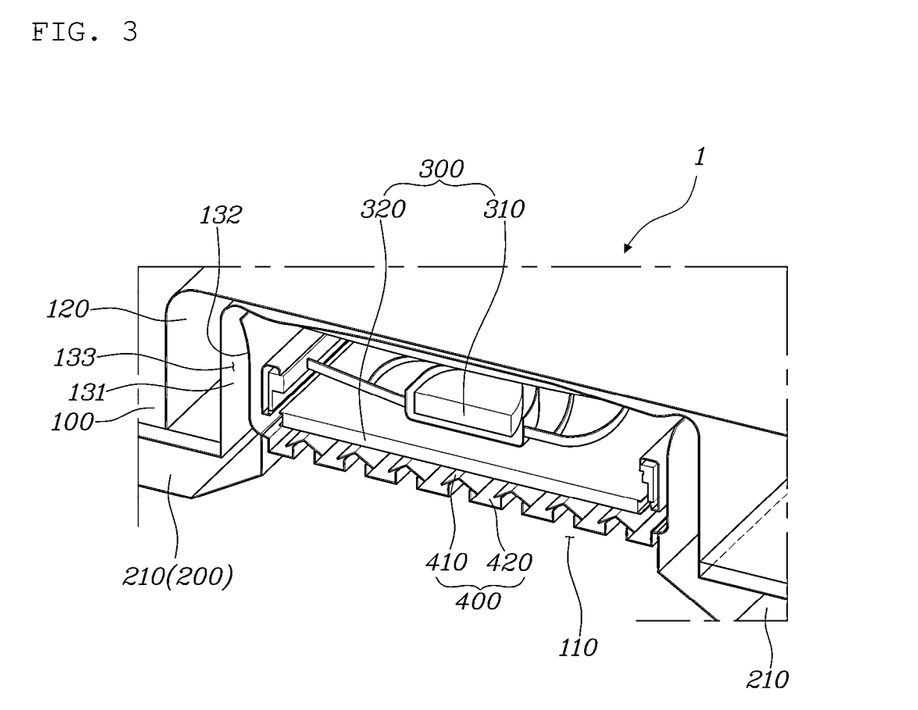
FIG. 3 is a cross-sectional perspective view of a roof-type air conditioner according to an embodiment of the present disclosure.
Figure 4:
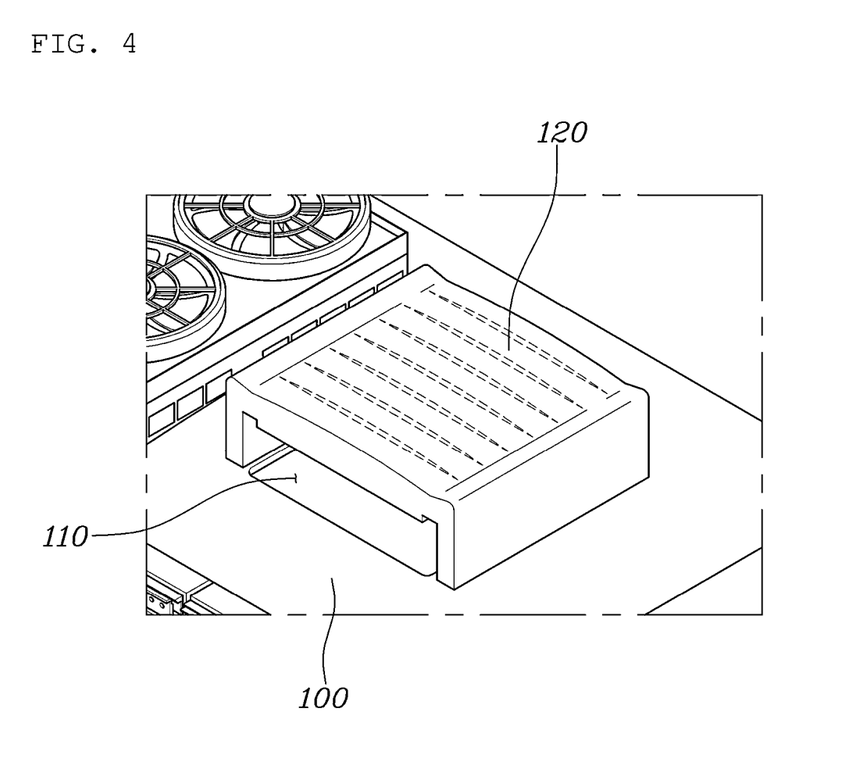
FIG. 4 is a view illustrating a case of the roof-type air conditioner according to an embodiment of the present disclosure.
Figure 5:
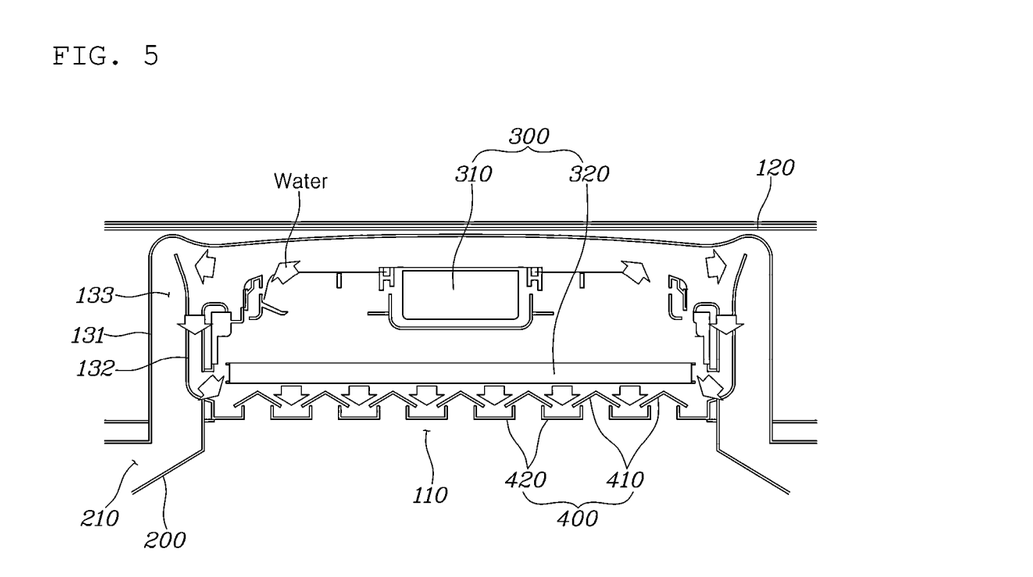
FIG. 5 is a cross-sectional view of the roof-type air conditioner according to an embodiment of the present disclosure.
Figure 6:
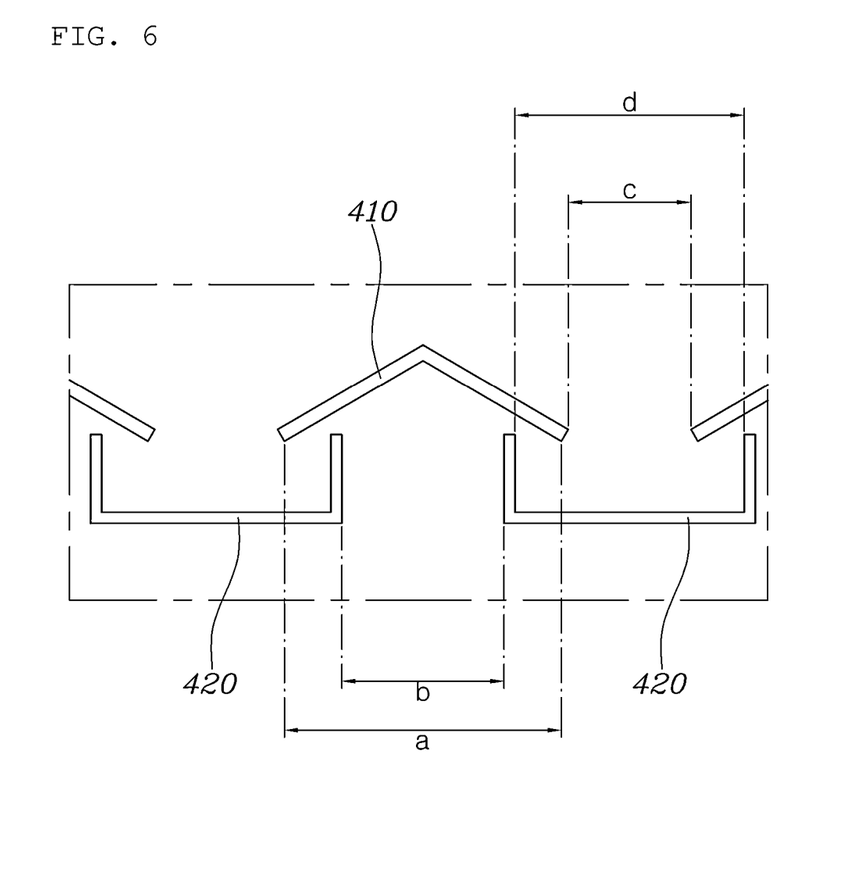
FIG. 6 is a view illustrating a collecting unit of the roof-type air conditioner according to an embodiment of the present disclosure.
Figure 7:
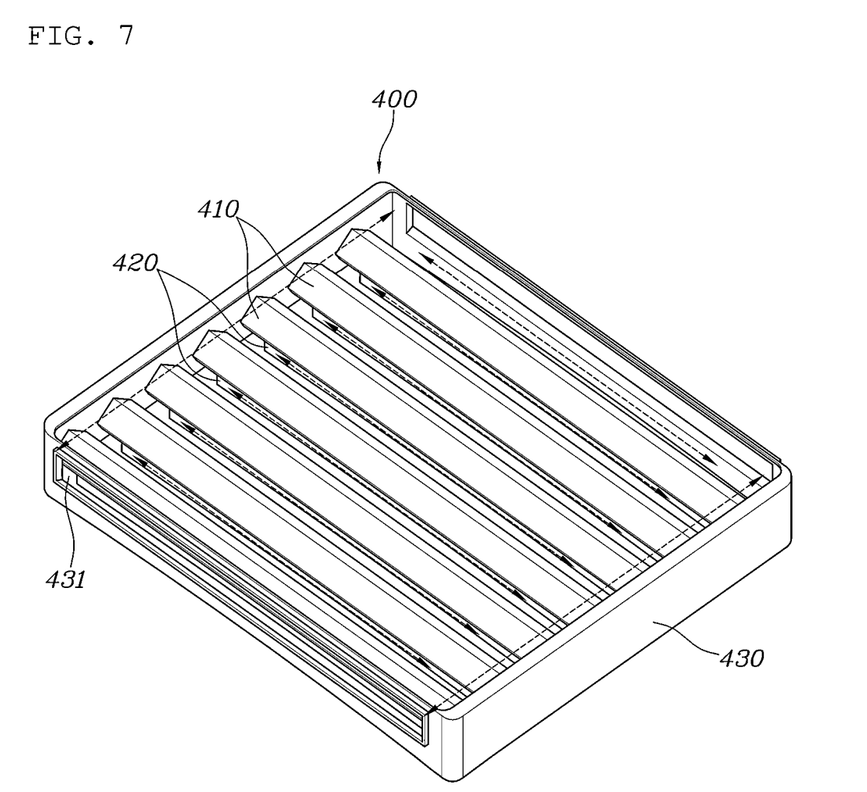
FIG. 7 is a view illustrating an embodiment of the collecting unit.
Figure 8:
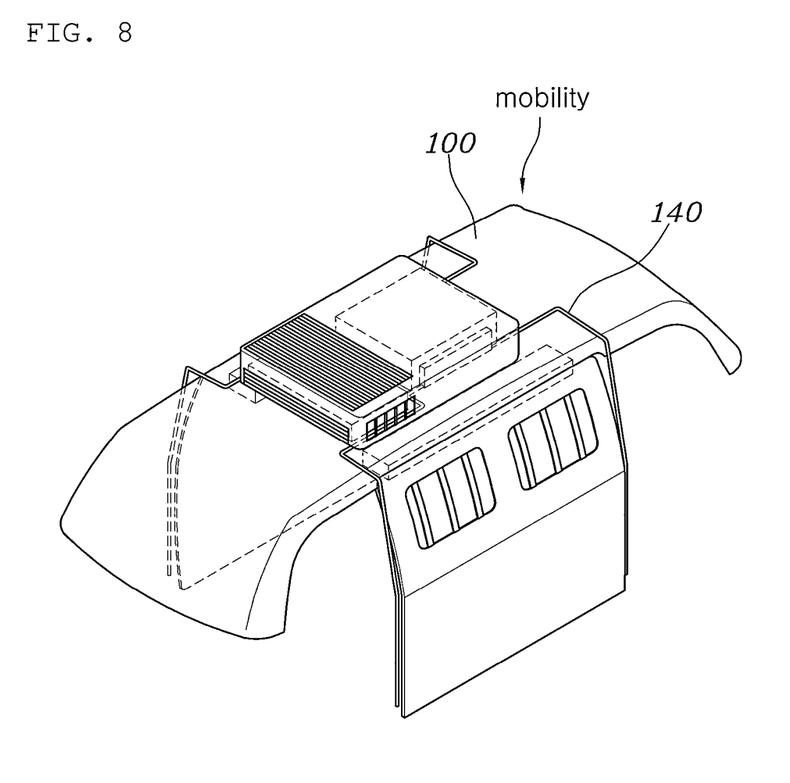
FIG. 8 is a view illustrating an embodiment of a drain flow path.
Figure 9:
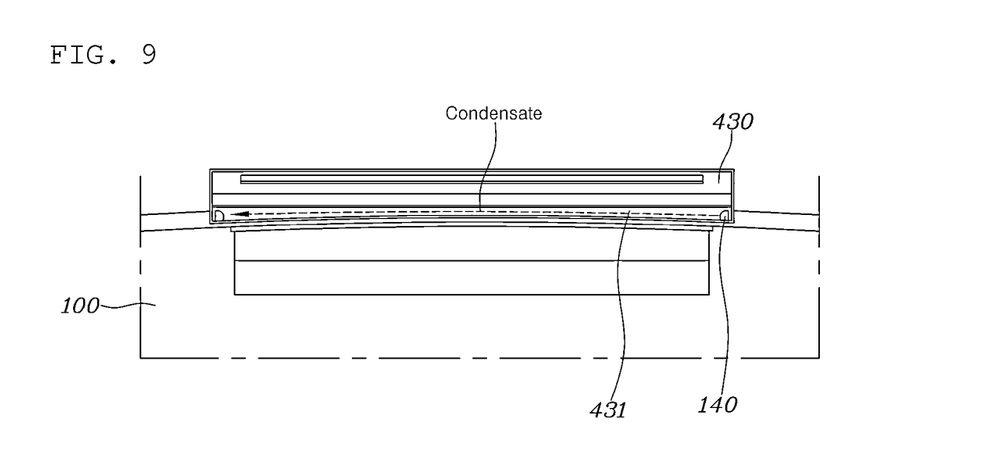
FIG. 9 is a view showing a housing and a drain flow path of an embodiment of the collecting unit.

FIG. 1 is a view illustrating a roof-type air conditioner according to an embodiment of the present disclosure. FIG. 2 is a block diagram of the roof-type air conditioner according to an embodiment of the disclosure. FIG. 3 is a cross-sectional perspective view of a roof-type air conditioner according to an embodiment of the present disclosure. FIG. 4 is a view illustrating a case of the roof-type air conditioner according to an embodiment of the present disclosure. FIG. 5 is a cross-sectional view of the roof-type air conditioner according to an embodiment of the disclosure. FIG. 6 is a view illustrating a collecting unit of the roof-type air conditioner according to an embodiment of the present disclosure. FIG. 7 is a view illustrating an embodiment of the collecting unit. FIG. 8 is a view illustrating an embodiment of a drain flow path. FIG. 9 is a view showing a housing and a drain flow path of the collecting unit.

As illustrated in FIGS. 1-3, a roof-type air conditioner (1) according to the present disclosure includes an opening section 110 opened in a roof 100 to communicate with an interior space of a vehicle. The roof-type air conditioner (1) also includes a roof duct 200 having multiple branched duct flow paths 210 in the roof 100. The roof-type air conditioner (1) also includes an air-conditioning unit 300 provided in the opening section 110 and configured to heat or cool air to provide the heated or cooled air to the roof duct 200. Furthermore, the roof-type air conditioner (1) includes a collecting unit 400 provided under the air-conditioning unit 300 in the opening section 110. The collecting unit includes multiple guide portions 410 configured to guide the condensate water generated in the air-conditioning unit 300 and multiple collecting portions 420 configured to collect the condensate water. The multiple guide portions 410 and the multiple collecting portions 420 are arranged to be spaced apart from the opening section 110 and to cross each other vertically.

The opening section 110 is provided in the roof 100 and may be a portion that penetrates the roof 100 so that the upper space of the roof 100 and the interior space communicate with each other.

The roof duct 200 includes multiple branched duct flow paths 210 in the roof 100. The duct flow paths 210 extend in various paths such as, through the vehicle's (i.e., mobility's) roof 100 and pillars (not illustrated), respectively, so that temperature-controlled and conditioned air is discharged through the air-conditioning unit 300 at various interior locations.

The air-conditioning unit 300 may be configured as a heating, ventilating, and air-conditioning system (HVAC). As illustrated in FIG. 2, the air-conditioning unit 300 may include a compressor 10, an interior heat exchanger 320, an expansion valve 20, and an outdoor heat exchanger 30. The air-conditioning unit 300 may further include a multi-way valve (i.e., 4-way valve) configured to switch the cooling/heating operation through the interior heat exchanger 320.

As mentioned above, the collecting unit 400 is provided below the air-conditioning unit 300 and includes the guide portions 410 and the collecting portions 420. The guide portions 410 are disposed below the air-conditioning unit 300 and cause condensate water generated in the air-conditioning unit 300 to move to the collecting portions 420. The collecting portions 420 collect the condensate water moving through the guide portions 410 to prevent the condensate water from flowing into the interior space of a vehicle.

In particular, the guide portions 410 and the collecting portions 420 may be spaced apart from the opening section 110 and may be arranged to cross over each other vertically. In other words, the condensate water generated in the air-conditioning unit 300 cannot pass through the opening section 110 because the condensate water is moved to the collecting portions 420 by the guide portions 410 or directly moved to the collecting portions 420 while moving toward the opening section 110. In addition, since the guide portions 410 and the collecting portions 420 are spaced apart from each other vertically and laterally, air is able to pass the spaces between the guide portions 410 and the collecting portions 420.

According to the present disclosure, since the collecting unit 400 is provided as described above, condensate water generated in the air-conditioning unit 300 is prevented from flowing into the interior space of a vehicle. Furthermore, air passes through the collecting unit 400 so that the temperature of the interior space of the vehicle can be controlled by the air-conditioning unit 300.

In detail, the air-conditioning unit 300 includes a blower 310 and an interior heat exchanger 320. When the blower 310 operates, interior air may be suctioned into the blower 310, subjected to temperature control through the interior heat exchanger 320, and then provided to the roof duct 200.

In other words, the air-conditioning unit 300 provided in the opening section 110 may include the blower 310 and the interior heat exchanger 320. During the operation of the blower 310, interior air is circulated to the interior heat exchanger 320 through the opening section 110. The interior heat exchanger 320 exchanges heat with the interior air to control the temperature of the interior air. The interior air, subjected to temperature control through the interior heat exchanger 320, may be supplied to the interior space again through the duct flow paths 210.

Of course, the air flowing by the blower 310 may be allowed to flow into the interior space through the interior heat exchanger 320 and through the opening section 110. However, condensate water may also flow into the interior space of a vehicle in a state of being excessively scattered by the wind of the blower 310. Therefore, the blower 310 is operated to suction the interior air so that the interior air passes through the opening section 110, exchanges heat through the interior heat exchanger 320, and is then circulated into the interior space through the duct flow paths 210.

As illustrated in FIG. 4, the roof 100 further includes a case 120 fixed to the upper side of the opening section 110. The roof 100 further includes the air-conditioning unit 300 therein. The case 120 may be made of a rigid body and may protect the air-conditioning unit 300 provided therein from external impact and contamination. In addition, multiple ribs may be provided in the case 120 to reinforce rigidity.

As illustrated in FIG. 5, an outer wall surface 131 and an inner wall surface 132 are provided in the roof 100. The outer wall surface 131 and the inner wall surface 132 are spaced apart from each other so that a circulation flow path 133 can be defined between the outer wall surface 131 and the inner wall surface 132. In this configuration, the duct flow paths 210 communicates with the circulation flow path 133 so that conditioned air passing through the air-conditioning unit 300 can be circulated into the interior space of the vehicle through each duct flow path 210.

In addition, the inner wall surface 132 prevents condensate water generated by the operation of the blower 310 of the air-conditioning unit 300 from entering the circulation flow path 133. This effectively prevents the scattered condensate water from being moved to the circulation flow path 133.

The inner wall surface 132 may include an upper end that is spaced apart from the upper end of the outer wall surface 131. The inner wall surface 132 may also include a lower end to which the guide portions 410 or the collecting portions 420 of the collecting unit 400 are connected.

Since the upper end of the inner wall surface 132 is spaced apart from the upper end of the outer wall surface 131 as described above, air flowing by the air-conditioning unit 300 may move upward and then flow through the circulation flow path 133. Furthermore, since the condensate water may scatter (i.e., move) to the circulation flow path 133 only when the condensate water is scattered to the upper end of the inner wall surface 132, the movement of the condensate water to the circulation flow path 133 may be minimized.

In addition, as mentioned above, the guide portions 410 or the collecting portions 420 are connected to the lower end of the inner wall surface 132. This arrangement ensures that when the condensate water formed on the inner wall surface 132 moves along the inner wall surface 132, the condensate water reaches the guide portions 410 or the collecting portions 420. As a result, the condensate water is prevented from flowing into the interior space of the vehicle.

In addition, the inner wall surface 132 has an upper end curved outward so that scattered condensate water can be efficiently prevented from entering the circulation flow path 133. Furthermore, since the condensate water formed on the upper end of the inner wall surface 132 moves downward along the curved portion, the condensate water can smoothly reach the guide portions 410 or the collecting portions 420.

The guide portions 410 and the collecting portions 420 each extend in one direction and may be arranged in a direction orthogonal to the extending direction. For example, as depicted in FIG. 5, the guide portions 410 and the collecting portions 420 each extend horizontally in parallel to the roof 100, and are arranged orthogonal to the horizontal direction.

In other words, the guide portions 410 and the collecting portions 420 extend to cross the opening section 110, and opposite ends thereof may be fixed to the roof 100 or the case 120. In addition, the guide portions 410 and the collecting portions 420 are horizontally spaced apart from each other by a predetermined interval in a state of being spaced apart from each other vertically, so that the guide portions 410 and the collecting portions 420 are arranged to cross over each other in the direction passing through the opening section 110. As a result, the configuration of the guide portions 410 and the collecting portions 420 block the movement of condensate water.

In detail, as illustrated in FIG. 6, the guide portions 410 have a cross-sectional shape of which the width gradually increases toward the lower side.

The cross-sections of the guide portions 410 are illustrated as having an inverted "V" shape. However, the cross-sections of the guide portions 410 may be formed in a semi-circular shape, a semi-elliptical shape, or the like to have a width that decreases toward the upper side and increases toward the lower side, thus having a downward inclination. Due to this, the condensate water formed on the guide portions 410 may flow downward along the inclination due to the shape of the guide portions 410 and may be stored in the collecting portions 420.

The collecting portions 420 may have a cross-sectional shape of which the width gradually increases toward the upper side.

The cross-sections of the collecting portions 420 are illustrated as having a "U" shape. However, the collecting portions 420 may have a semi-circular shape, a semi-elliptical shape, or the like to have a width that increases toward the upper side and decreases toward the lower side, thereby forming a cup shape that is opened to the upper side. Due to this, scattered condensate water flowing down from the guide portions 410 can be collected and stored by the collecting portions 420.

In addition, the horizontal width (a) of the guide portions 410 may be greater than the separation distance (b) between adjacent ones of the collecting portions 420. Due to this configuration, the guide portions 410 are arranged such that the widthwise opposite ends thereof partially overlap the collecting portions 420. Thus, the condensate water does not pass through the guide portions 410 or the collecting portions 420 in a direction perpendicular to the opening section 110, thereby preventing any condensate water from flowing into the interior space of the vehicle. In addition, the separation distance (c) between adjacent ones of the guide portions 410 may be smaller than the horizontal width (d) of the collecting portions 420 so that the guide portions 410 may be arranged to partially overlap the collecting portions 420.

The guide portions 410 may be opened downward, and the collecting portions 420 may be opened upward, so that the guide portions 410 and the collecting portions 420 may be partially inserted into the mutually opened portions.

In this way, since the guide portions 410 and the collecting portions 420 are arranged vertically and the guide portions 410 are disposed to be opened downward, the collecting portions 420 can be inserted into the lower spaces of the guide portions 410. Furthermore, since the collecting portions 420 are opened upward, the guide portions 410 can be inserted into the upper spaces of the collecting portions 420. Through this configuration, the guide portions 410 and the collecting portions 420 may be disposed to be partially inserted into the spaces of the mutually opened portions. Furthermore, since the guide portions 410 and the collecting portions 420 partially overlap each other, the overall size of the collecting unit 400 can be reduced.

In addition, since the guide portions 410 and the collecting portions 420 are arranged to be partially inserted into the mutually opened portions, the configuration makes it difficult for the condensate water to move up and down again in order to pass through the guide portions 410 and the collecting portions 420 through the opening section 110. As a result, this configuration advantageously prevents condensate water from flowing into the interior space of the vehicle.

The collecting portions 420 may have a condensate water collection capacity that may be determined depending on the amount of dehumidification of the air-conditioning unit 300.

In other words, the collecting portions 420 have the opened upper ends and are configured to collect condensate water therein. The volume of the space where the condensate water is collected is determined depending on the amount of dehumidification of the air-conditioning unit 300. The amount of dehumidification may correspond to the amount of generated condensate water.

For example, the amount of dehumidification may be calculated by using the driving amount of the blower 310, the performance of the interior heat exchanger 320, the external humidity, the external temperature, and the inlet and outlet enthalpies of the interior heat exchanger 320. The capacity of the condensate water that is collectible by the collecting portions 420 may be derived by using the calculated amount of dehumidification.

In this way, the condensate water collection capacity is determined depending on the amount of dehumidification. As a result, the number and length of the collecting portions 420 may be determined depending on the condensate water collection capacity.

As illustrated in FIGS. 7-9, the collecting unit 400 further includes a housing 430 to which opposite ends of the multiple guide portions 410 and collecting portions 420 are connected.

In the collecting unit 400, the guide portions 410 and the collecting portions 420 are provided in the housing 430. The opposite ends of the guide portions 410 and the collecting portions 420 are fixed to the inner surface of the housing 430.

A discharge flow path 431 is provided in the housing 430 so that the condensate water collected in each collecting portions 420 flows or is discharged to the outside of the vehicle. The discharge flow path 431 is connected to the opposite ends of each collecting portion 420 inside the housing 430 and may extend along the periphery of the housing 430. As a result, the condensate water collected in the collecting portions 420 is discharged to the outside through the discharge flow path 431 or is dispersed in the large area of the discharge flow path 431. As a result, this configuration prevents the condensate water from being excessively collected in the collecting portions 420.

As can be seen in FIGS. 8 and 9, the roof 100 includes a drain flow path 140 connected to the discharge flow path 431 of the housing 430. The drain flow path extends to the exterior of the vehicle so that the condensate water in the housing 430 is discharged to the outside.

The drain flow path 140 may be configured with a hose and is connected to the discharge flow path 431 of the housing 430. The drain flow path 140 may extend along the outer peripheral shape of the roof 100 or extend to a pillar to allow the condensate water to be discharged to the outside. In the drain flow path 140, a portion connected to the discharge flow path 431 of the housing 430 is located at the highest position of the drain flow path 140 and gradually extends to a lower position so that condensate water can be smoothly discharged along the drain flow path 140.

In the roof-type air conditioner having the structure as described above, since the condensate water generated during interior cooling through the air-conditioning unit 300 is collected in the collecting unit 400, the condensate water is prevented from flowing into the interior of the vehicle. Therefore, since the condensate water collected by the collecting unit 400 is discharged to the outside, the overflow and contamination of condensate water due to the accumulation of the condensate water are prevented.

Although the present disclosure has been described and illustrated in conjunction with particular embodiments thereof, it should be apparent to those having ordinary skill in the art that various improvements and modifications may be made to the present disclosure without departing from the technical idea of the present disclosure defined by the appended claims.

What is claimed is:
1. A roof-type air conditioner comprising:
an opening section opened in a roof to communicate with an interior space of a vehicle;

a roof duct including a duct flow path configured to communicate with the opening section in the roof;

an air-conditioning unit provided in the opening section and configured to heat or cool air to provide the heated or cooled air to the roof duct; and a collecting unit provided under the air-conditioning unit in the opening section, the collecting unit including multiple guide portions configured to guide condensate water generated in the air-conditioning unit and multiple collecting portions configured to collect the condensate water, wherein the multiple guide portions and the multiple collecting portions are arranged to be spaced apart from the opening section and to cross over each other vertically, wherein the roof is provided with an outer wall surface and an inner wall surface on sides of the opening section in the roof, wherein the outer wall surface and the inner wall surface are spaced apart from each other to provide a circulation flow path therebetween, wherein the circulation flow path is provided to fluidly communicate with the duct flow path, wherein the inner wall surface comprises an upper end and a lower end, and wherein the upper end of the inner wall surface is spaced apart from an upper end of the outer wall surface to allow the air to flow over the upper end of the inner wall surface in a height direction of the air-conditioning unit, and the guide portions or the collecting portions of the collecting unit are connected to the lower end of the inner wall surface.

2. The roof-type air conditioner of claim 1, wherein the air-conditioning unit comprises a blower and an interior heat exchanger, and wherein the air conditioning unit is configured to suction interior air, adjust a temperature of the interior air, and then supply the interior air to the roof duct.

3. The roof-type air conditioner of claim 1, further comprising:

a case fixed to an upper side of the opening section in the roof, wherein the air-conditioning unit is provided inside the case.

4. The roof-type air conditioner of claim 1, wherein the upper end of the inner wall surface extends to be curved outward.

5. The roof-type air conditioner of claim 1, wherein the guide portions and the collecting portions each extend in one direction and are arranged in a direction orthogonal to the extending direction.

6. The roof-type air conditioner of claim 1, wherein the guide portions have a cross-sectional shape of which a width gradually increases toward a lower side.

7. The roof-type air conditioner of claim 1, wherein the collecting portions have a cross-sectional shape of which a width gradually increases toward an upper side.

8. The roof-type air conditioner of claim 1, wherein the guide portions have a horizontal width that is greater than a separation distance between adjacent collecting portions of the collecting portions.

9. The roof-type air conditioner of claim 1, wherein the guide portions are opened downward, and the collecting portions are opened upward, so that the guide portions and the collecting portions are partially inserted into mutually opened portions.

10. The roof-type air conditioner of claim 1, wherein the collecting portions have a condensate water collection capacity that is determined based on an amount of dehumidification of the air-conditioning unit.

11. The roof-type air conditioner of claim 1, wherein the collecting unit further comprises a housing to which opposite ends of the multiple guide portions and multiple collecting portions are connected, and wherein the housing is provided with a discharge flow path such that the condensate water collected in each of the collecting portions is discharged outside.

12. The roof-type air conditioner of claim 11, wherein the roof is provided with a drain flow path which is connected to the discharge flow path of the housing and extends outside such that the condensate water in the housing is discharged outside of the vehicle.

* * * * *